United States Patent [19]

Shimizu

[11] 4,275,619
[45] Jun. 30, 1981

[54] ROLLER FEED TYPE INSULATED WIRE CUTTING AND INSULATION STRIPPING MACHINE

[75] Inventor: Akira Shimizu, Amagasaki, Japan
[73] Assignee: Shin Meiwa Industry Co., Ltd., Nishinomiya, Japan
[21] Appl. No.: 39,856
[22] Filed: May 17, 1979

Related U.S. Application Data

[63] Continuation-in-part of Ser. No. 886,950, Mar. 15, 1978, abandoned.

[30] Foreign Application Priority Data

Mar. 25, 1977 [JP] Japan .............................. 52-7733632
Mar. 25, 1977 [JP] Japan .............................. 52-7733633

[51] Int. Cl.³ ............................................. H02G 1/12
[52] U.S. Cl. ........................ 81/9.51; 29/33 M;566.1; 140/1
[58] Field of Search ............... 29/566.1, 566.3, 33 M; 226/42, 111, 113, 117, 118; 81/9.51; 140/1

[56] References Cited

U.S. PATENT DOCUMENTS

| | | | |
|---|---|---|---|
| 2,929,284 | 3/1960 | Hagstrand | 87/9.51 |
| 3,098,596 | 7/1963 | Kulicke, Jr. et al. | 226/117 |
| 3,771,114 | 11/1973 | Buchan et al. | 226/42 X |
| 3,807,612 | 4/1974 | Eggert | 226/42 |
| 3,937,112 | 2/1976 | Geeson | 226/117 X |

FOREIGN PATENT DOCUMENTS 828031 5/1938 France ..................... 226/111

Primary Examiner—Z. R. Bilinsky
Attorney, Agent, or Firm—W. G. Fasse; D. F. Gould

[57] ABSTRACT

First feed rollers whose speed is variable, second feed rollers intermittently driven and movable in the direction of an insulated wire, a clamp which is movable in the direction of the axis of the wire and can be opened and closed during the interruption of driving by the second feed rollers, insulation cutting and stripping blades which can be opened and closed, a wire guiding device which can be opened and closed, wire cutting blades which can be opened and closed, insulation cutting and stripping blades, and a clamp which is movable along the axis of the wire and may be opened and closed during the interruption of driving by the second feed rollers in the direction of the axis of the wire, are arranged in the order mentioned from the upstream to the downstream side of the path of travel of the insulated wire, with a suitable spacing between adjacent components. The wire guiding device changes from its closed to its opened state from the time a little before a cutting blades group starts its closing operation until the time it completes its closing operation. The same also changes from its opened to its closed state from the time the clamps start their return movement until the time a little before they complete their return movement. The second feed rollers are controlled so that in the opened state of the wire guiding device, they may be moved in timed relation to the clamp on the upstream side. Thus, an efficient operation becomes possible while thoroughly disposing of the chips of insulation, and the insulated wire cut into accurate lengths can be supplied.

4 Claims, 11 Drawing Figures

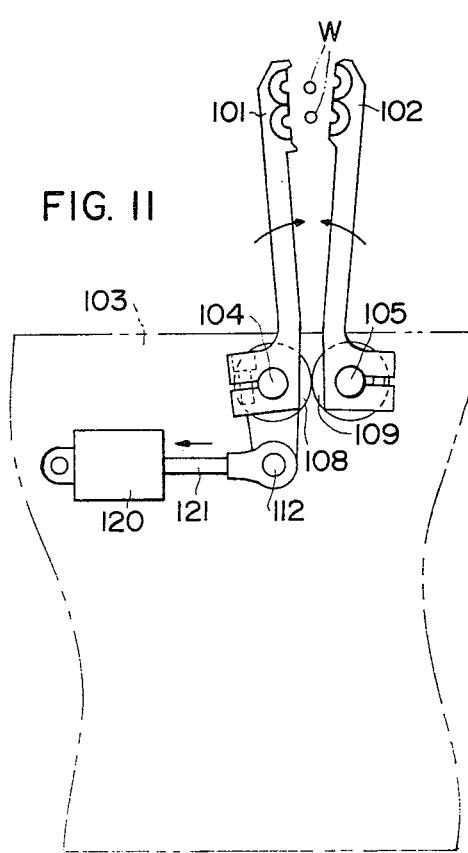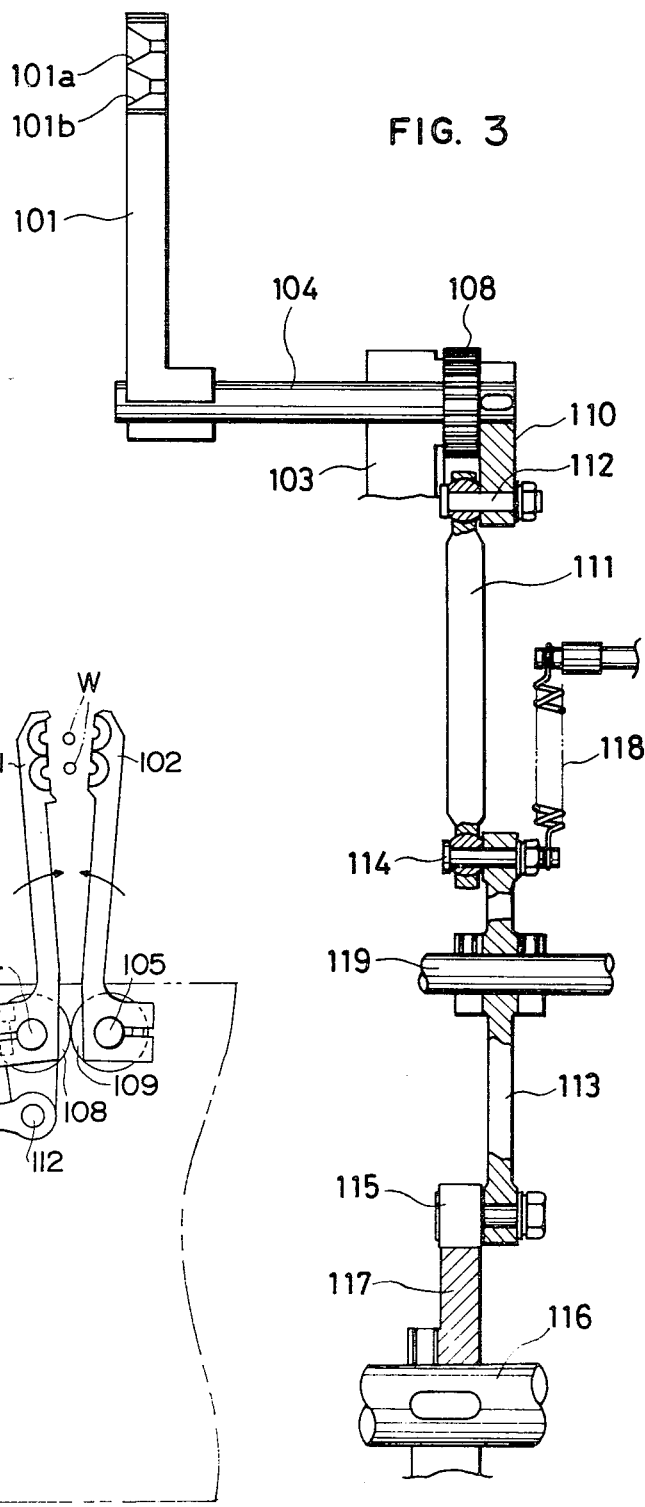

ROLLER FEED TYPE INSULATED WIRE CUTTING AND INSULATION STRIPPING MACHINE

CROSS REFERENCE TO RELATED APPLICATIONS

This application is a continuation-in-part application of my copending application Ser. No. 886,950; filed: Mar. 15, 1978 now abandoned.

BACKGROUND OF THE INVENTION

The present invention relates to a roller feed type insulated wire cutting and insulation stripping machine and more particularly it relates to improvements therein which provide for the cutting of an insulated wire into accurate lengths, positive and smooth feed and an efficient operation.

Most of the conventional roller feed type insulated wire cutting and insulation stripping machines are composed of a feed mechanism section and an intended mechanism section. In the feed mechanism section, the insulated wire from a wire supply source is continuously withdrawn by a pair of continuously driven variable-speed first feed rollers disposed in the upstream side of the feed path, and the withdrawn wire is allowed to slack where it just leaves the first feed rollers. It is then taken out by a pair of second feed rollers disposed downstream of and spaced a predetermined distance from the first feed rollers. The second feed rollers are provided with a length measuring mechanism and adapted to intermittently take out the wire existing in the slack section according to desired length-measuring conditions. The second feed rollers accurately and smoothly transfer the wire to the intended mechanism comprising a cutting blades group, etc., disposed downstream thereof. In the intended mechanism section, the cutting of the wire and of the insulation on both sides of the cut is effected by the opening and closing of a cutting blade group which comprises a pair of opposed wire cutting blades and pairs of opposed insulation cutting and stripping blades juxtaposed on both sides of said cutting blades while the stripping of the insulation on both sides of the cut is effected by movable clamps provided on both sides of said cutting blades group when they pull the wire away from the cutting blade group, there has been provided a hollow cylindrical wire guide pipe between the pair of wire cutting blades and each pair of insulation cutting and stripping blades to guide the wire into between the pair of wire cutting blades and each pair of insulation cutting and stripping blades.

With this arrangement, however, since a chip of insulation remains in the wire guide pipe after the stripping of the insulation, an air blowing device is needed to blow off the same, which increases the cost of installation. Moreover, said chip of insulation is often caught by the wire guide pipe, causing troubles to the next operation. Thus, it has not been necessarily desirable for use as a wire guiding device.

Further, it is usual with said second feed rollers that they are installed so that their axes will not be displaced. In such case, when said movable clamp disposed just downstream of the second feed rollers is moved to the upstream side during insulation stripping, the wire portion between said movable clamp and said second feed rollers acquires a tendency to bend. Such tendency obstructs the subsequent advance of the wire into the cutting blades group.

Moreover, despite the accurate measurement of the length of the wire being fed by the cooperation between said first feed rollers, second feed rollers and the wire slack section defined between said first and second feed rollers, the occurrence of said bending tendency at the intended mechanism section can produce errors in the lengths into which the wire is cut.

OBJECTS OF THE INVENTION

This invention is intended to eliminate the drawbacks inherent in the conventional systems described above.

Accordingly, a principal object of the invention is to provide a roller feed type insulated wire cutting and insulation stripping machine which assures the smooth and positive feeding of a wire;

another object of the invention is to provide a roller feed type insulated wire cutting and insulation stripping machine provided with simple and inexpensive means for removing the chips of insulation which remain after the insulation stripping has been completed;

a further object of the invention is to provide a roller feed type insulated wire cutting and insulation stripping machine which is high in the efficiency of the operation; and still a further object of the invention is to provide a roller feed type insulated wire cutting and insulation stripping machine adapted to prevent the wire from acquiring a tendency to bend, whereby accurate cut lengths of wire can be obtained.

SUMMARY OF THE INVENTION

The invention includes a wire guiding device in an insulated wire cutting and insulation stripping machine, which device is interposed between the pair of wire cutting blades and the pair of insulation cutting and stripping blades adjacent the wire supply source. The wire guiding device is arranged so that only when the wire advance, to the cutting blades group, it is closed to guide said wire and at the time of stripping of insulation, it is opened so as not to interfere with the falling of chips. Further, it includes feed rollers corresponding to the conventional second feed rollers, and a movable clamp disposed downstream of said feed rollers. The feed rollers and movable clamp are arranged so that they are movable as a unit in the direction of feed of the wire. Thus, the invention provides a roller feed type insulated wire cutting and insulation stripping machine adapted to prevent the wire from acquiring the tendency to bend during insulation stripping.

BRIEF FIGURE DESCRIPTION

In order that the invention may be clearly understood, it will now be described, by way of example, with reference to the accompanying drawings, wherein:

FIG. 3 is a section view taken along the line A-B-C-D-E-F-G-H of FIG. 2;

FIG. 11 shows another example of the portion shown in FIG. 2.

DETAILED DESCRIPTION OF PREFERRED EXAMPLE EMBODIMENTS AND OF THE BEST MODE OF THE INVENTION

Figure 1:
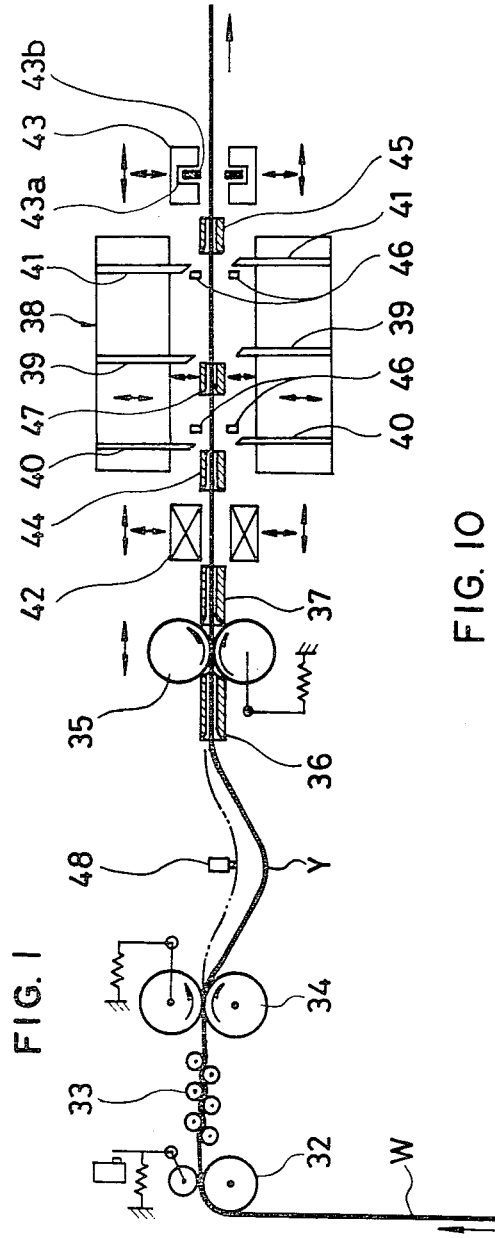
FIG. 1 is a schematic view of an embodiment of the invention in its entirety.

FIG. 1 is a schematic view of a roller feed type insulated wire cutting and insulation stripping machine (hereinafter referred to as wire stripper) in its entirety according to an embodiment of the invention.

The invention will now be described in detail with reference to such application. The numeral 31 denotes a stock roll of wire W; 32 denotes a guide roller; 33 denotes a wire straightening roller group with a number of rollers arranged in a zigzag; and 34 denotes first feed rollers two in a set, adapted to be variable-speed and driven continuously. Denoted at 35 are second feed rollers two in a set, adapted to be driven intermittently and associated with a length-measuring mechanism capable of measuring off lengths of wire as the latter is passed by the rotation of said rollers. Denoted at 36 and 37 are wire guide pipes disposed on both sides of said second feed rollers 35 and adapted to be moved integrally with said second feed rollers 35 in synchronism with an insulation stripping operation to be later described.

The numeral 38 denotes a cutting blades group comprising a pair of opposed wire cutting blades 39 and pairs of opposed insulation cutting and stripping blades 40, 41 juxtaposed on both sides of said cutting blades, and the numerals 42 and 43 denote two-part, wire gripping and insulation stripping, left and right clamps (the indication of right and left being as viewed in FIG. 1) disposed on both sides of said cutting blades group 38, said clamps being adapted to be closed in synchronism with the closing of said cutting blades group 38, the opening of said clamps being separately effected as will be later described, said clamps being capable of moving away from the cutting blades group 38 to strip the insulation of the wire W between the wire cutting blades 39 and the insulation cutting and stripping blades 40 and 41 when said cutting blades group 38 is closed.

The opposed surfaces of said right clamp 43 are formed with vertically extending long grooves 43a, in which wire sticking-preventing bars 43b are fixed so that when said clamp 43 is in its open state they slightly project so as to knock off the cut wire W' which sticks to the clamp surfaces when the clamp 43 is opened. The numerals 44 and 45 denote left and right fixed wire guide pipes fixed in position between said insulation cutting and stripping blades 40, 41 and the left and right clamps 42, 43, and the numeral 46 denotes pairs of opposed chip-removing bars interposed between the wire cutting blades 39 and the insulation cutting and stripping blades 40, 41 so as to remove the chips of insulation R sticking to the wire cutting blades 39 or the insulation cutting and stripping blades 40, 41 when said cutting blades group 38 is opened. The upstream openings in said fixed wire guide pipes 44 and 45 are flared to facilitate the travel of the wire W.

The numeral 47 denotes a wire guiding device which can be opened and closed and is interposed between said wire cutting blades 39 and the left-hand insulation cutting and stripping blades 40 and which is arranged so that only when said cutting blades group 38 is closed it is opened in synchronism with it so that it is closed a little before the completion of the return movement of said left and right clamps 42 and 43, so as to prevent the sag of the wire W for horizontal guidance of the latter.

The arrangement of said wire guiding device 47 will now be described with reference to FIGS. 2 and 3.

The numerals 101 and 102 denote a pair of opening and closing arms fixed by bolts 106 and 107 to horizontal shafts 104 and 105 pivotally supported in a support frame 103 so that they can be rotated integrally with the respective shafts, the opposed upper end surfaces of said arms being formed with split frusto-conical recesses 101a, 101b and 102a, 102b flared on their upstream sides to define small holes a little larger than the wire diameter when said arms are closed.

The numerals 108 and 109 denote gears fixed on the ends of said horizontal shafts 104 and 105 opposite to the arms with respect to the support frame 103 so that they mesh with each other; 110 denotes a swinging arm fixed on the shaft of one gear 108, 111 denotes a horizontal swing arm swingably connected at one end thereof to said swinging arm 110 by a pin 112 and at the other end thereof to one arm end of a bell crank 113 by a pin 114, said bell crank being pivotally supported in said support frame 103; and the numeral 115 denotes a cam follower pivotally supported on the other arm end of said bell crank 113 and engaged with a cam 117 fixed on a drive transmission shaft 116 suitably connected to a drive source (not shown), said cam follower being urged against said cam 117 at all times by a tension spring 118 loaded between said pin 114 and a suitable place on said support frame 103.

Figure 2:
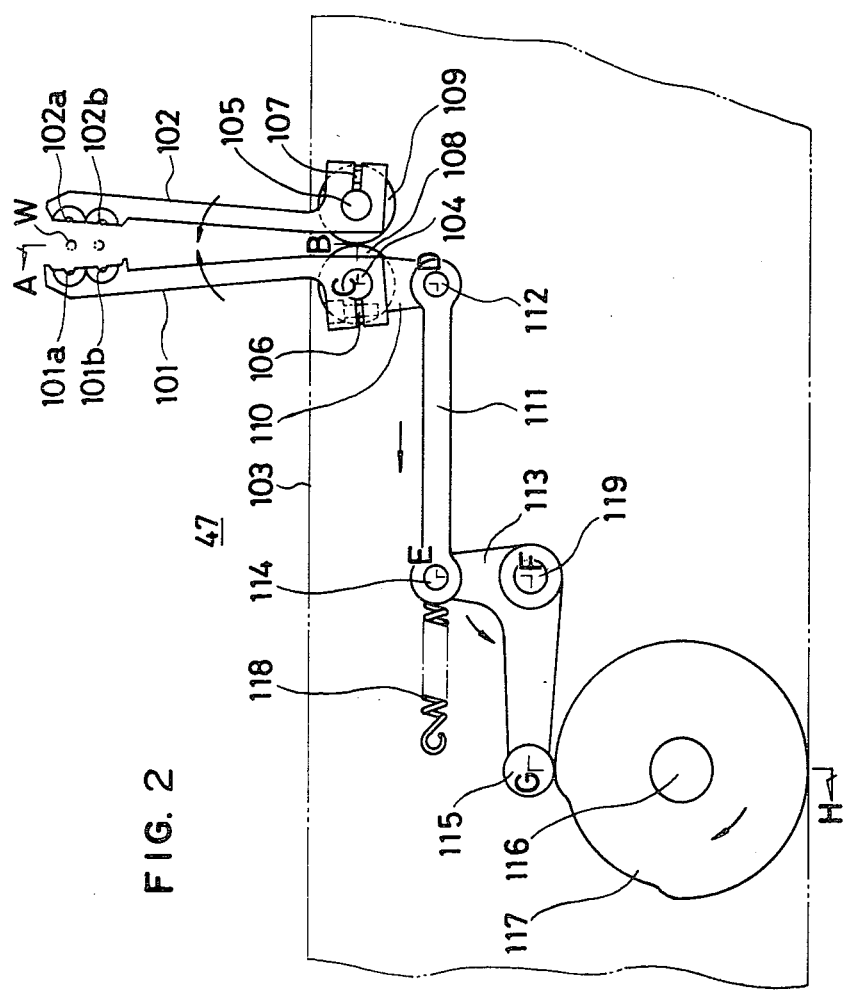
FIG. 2 is a fragmentary enlarged detailed view of FIG. 1.

Thus, normally, said opening and closing arms 101 and 102 are in their open state, with the cam follower 115 engaging with the higher region of the cam 117, as shown in FIG. 2. As the cam 117 is rotated in a clockwise direction, the cam follower 115 engages with the lower region of the cam 117, so that the bell crank 113 is swung in a counterclockwise direction around the shaft 119 by the spring force of the tension spring 118. The swinging of said bell crank 113 causes the horizontal link 111 to be moved toward the tension spring 118, rotating the swinging arm 110 clockwise. Therefore, said gears 108 and 109 are turned clockwise and counterclockwise, respectively, and said opening and closing arms 101 and 102 complete the closing action. The opening action of said opening and closing arms 101 and 102 begins when the cam follower 115 transfers to the higher region, the operation being the reverse of the closing action described above.

Thus, the wire is arranged so that it always has some amount of wire slacking section Y between the first and second feed rollers 34 and 35. The numeral 48 denotes a limit switch disposed in said wire slacking section Y so that it can detect the wire W reaching the predetermined minimum amount of slack, whereupon it actuates a suitable timer (not shown) to accelerate the first feed rollers 34 for a fixed time.

In addition, it is to be understood that the normal rotative speed of said first feed rollers 34 has been adjusted such that the amount of wire fed thereby is slightly less than the amount of wire fed by the second feed rollers 35 in each drive period including the stoppage period of the second feed rollers. Further, as for the means of varying the speed of the first feed rollers 34, it may be easily realized by employing known means which utilizes variations in voltage or current.

As for the length-measuring mechanism, it may be a known arrangement comprising a pulse generator which produces electric pulses corresponding in number to each predetermined length of wire to be fed, a pulse counter which counts the pulses from said pulse generator, and a control circuit for stopping the drive of said second feed rollers 35 when a predetermined number of pulses have been counted and then re-starting said second feed rollers 35 after the lapse of a predetermined time.

As for the detector, instead of said limit switch 48 it is also possible to use a proximity switch, photoelectric tube or the like.

In addition, in the above embodiment, the opening and closing operation of the opening and closing arms 101 and 102 has been described as being effected by a cam mechanism, but the end of the swinging arm 110 may be electrically actuated as by a solenoid mechanism.

FIG. 11 shows a case in which it is actuated by a solenoid mechanism. FIG. 11 shows a portion corresponding to the portion shown in FIG. 2 described above. Accordingly, the parts corresponding to those shown in FIG. 2 are given like reference characters, and the same description will be omitted. Referring to FIG. 11, the front end of the plunger 121 of a solenoid 120 is directly connected to the pin 112. With this construction, upon the energization and de-energization of the solenoid 120, the arms 101 and 102 are turned. Thus, the wire guiding device 47 which can be opened and closed can also be achieved by using such mechanism.

Figure 10:
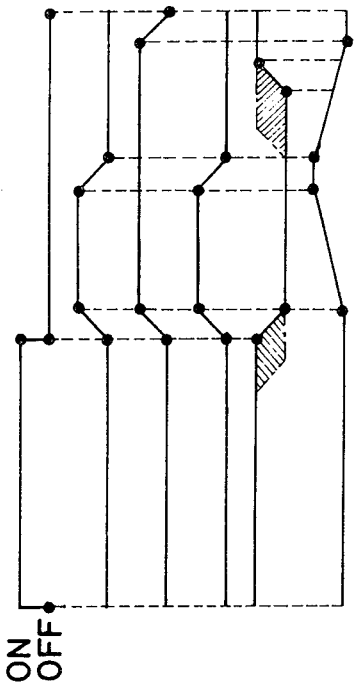
FIG. 10 is a time chart for explanation of the apparatus of FIG. 1.

Further, as for the points of time at which the opening and closing arms 101 and 102 are opened and closed, such operation may be effected at any position without any trouble so long as it is within the shaded ranges shown in FIG. 10.

Figure 4:
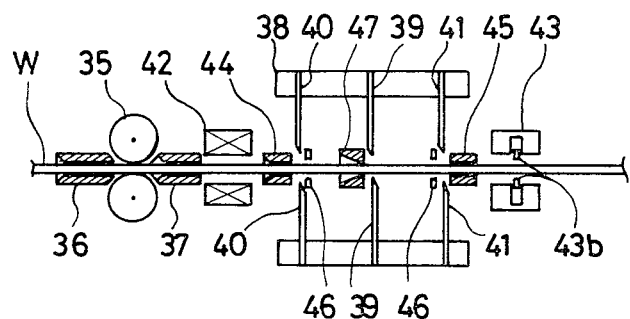
FIGS. 4 through 9 are views explanatory of the operation of the apparatus of FIG. 1.
Figure 5:
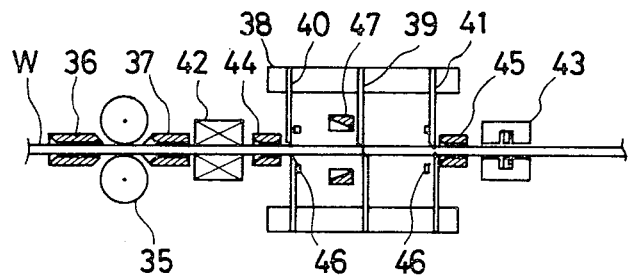
Figure 6:
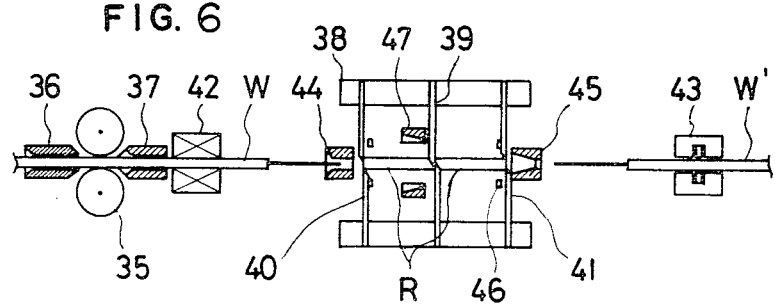

The operation will now be described. When the device is started with the wire W arranged in the manner shown in FIG. 1, the wire W is payed out toward the slack section Y by the continuous normal rotation of the first feed rollers 34. When the second feed rollers 35 are rotated, the portion of the wire W stored in said slack section Y is smoothly fed toward the wire stripper. Thus, when the predetermined amount of wire has been fed out, said rollers are temporarily stopped by the action of the length-measuring mechanism (FIG. 4). Then the left and right clamps 42, 43 and the wire guiding device 47 are closed and opened, respectively, and at the same time, the cutting blades group 38 is also closed (FIG. 5). At this moment, the insulated wire W has its insulation and core cut by the wire cutting blades 39, while only the end insulations of the remaining wire W and cut wire W' are cut by the insulation cutting and stripping blades 40 and 41 adjacent their ends. In this condition, the left and right clamps 42 and 43 are moved respective predetermined distances away from the cutting blades group 38 (FIG. 6). In synchronism with the movement of said left-hand clamp 42, the second feed rollers 104 and the wire guide pipes 36, 37 are integrally moved. Further, as for the distances said left and right clamps 42 and 43 are displaced, the right-hand clamp 43 covers a greater distance. Thus, as shown in FIG. 6, the remaining wire W gripped by the left-hand clamp 42 has its bare end remaining in the left-hand fixed wire guide pipe 44, while the cut wire W' gripped by the right-hand clamp 43 is completely separated at the downstream side of the right-hand fixed wire guide pipe 45.

Figure 7:
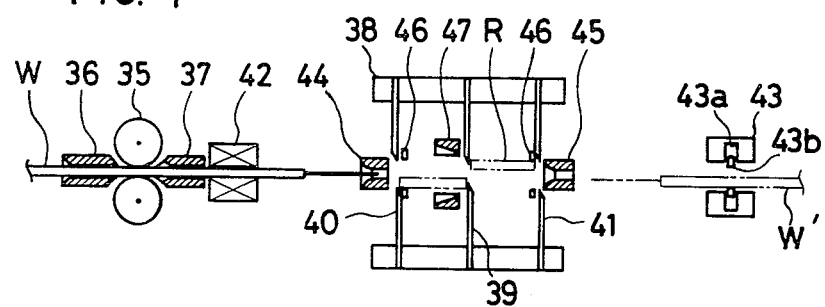

Subsequently, the cutting blades group 38 and the right-hand clamp 43 are opened, so that the insulation removing bars 46 and the wire sticking-preventing bars 43b cause the chips of insulation R and the cut wire W' to drop (FIG. 7).

Figure 8:
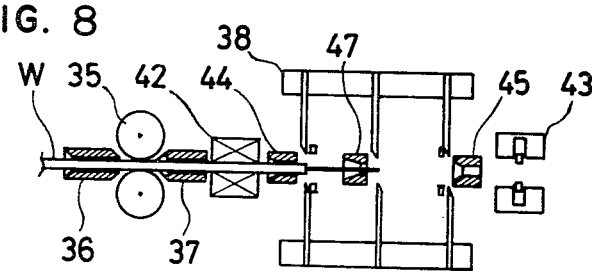
Figure 9:
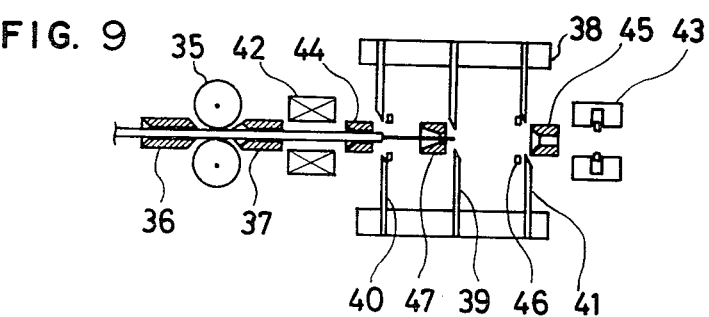

The left and right clamps 42, 43 and the unit of said second feed rollers 35 and wire guide pipes 36, 37, which are now in their displaced positions, then execute return motion, in the course of which the wire guiding device 47 is closed to guide and support the advancing remaining wire W so that the bare end of the latter can travel straightly (FIG. 8). The left-hand clamp 42 is then opened (FIG. 9). This completes one cycle and said second feed rollers 35 are re-started to initiate the next cycle (FIG. 4). Since the feeding of the wire W by the first feed rollers 34 is continued during the time the second feed rollers 35 are temporarily stopped, although the amount of slack in the wire slacking section Y decreases at the time of completion of wire feeding effected by the second feed rollers 35, the slack has been restored approximately to the predetermined maximum amount by the continuous feed during the stop period.

Since the amount of feed by the first feed rollers 34 has been set at a less value in consideration of the fact that the amounts of feed by the first and second feed rollers 34 and 35 in a given time cannot be equalized, the amount of slack of wire, after several cycles of said operation, tends to be below the predetermined amount. This is detected by the limit switch 48, so that the first feed rollers 34 are accelerated for a fixed time, whereby the amount of slack wire is increased again.

In addition, the invention may also be embodied by setting the normal rotative speed of the first feed rollers at a value such that the amount of wire fed thereby is a little larger than the amount of wire fed by the second feed rollers, with the detector disposed to detect the predetermined maximum amount of slack to decelerate the first feed rollers for a fixed time.

As has been described so far, the insulated wire cutting and insulation stripping machine of the present invention is arranged so that only when the wire advances to the cutting blades group the mechanism is closed to securely guide said wire to enable the latter to travel straight and so that upon completion of insulation stripping, it is opened to free the insulation chips to allow the latter to drop with ease. Thus, since it does not require an air blowing device or the like, there is no loss of time and the cost of installation can be reduced.

Further, since the second feed rollers and the first clamp (said left clamp) disposed downstream of said second feed rollers are arranged to be movable as a unit in the direction of feed of the wire, there is no possibility of the wire acquiring a tendency to bend between said rollers and said clamp during insulation stripping and hence successive accurately measured-off portions of the wire can be positively fed to the cutting blades group to provide accurate cut lengths of the wire.

Although the invention has been described with reference to specific example embodiments, it is to be understood, that it is intended to cover all modifications and equivalents within the scope of the appended claims.

What is claimed is:

1. A roller feed type insulated wire cutting and insulation stripping apparatus, comprising a feed mechanism and a cutting and stripping mechanism, said feed mechanism serving to intermittently feed an insulated wire drawn from a wire supply source toward said cutting and stripping mechanism according to desired length-measuring conditions, said cutting and stripping mechanism serving to cut the thus fed wire and strip the insulation from the cut wire end, wherein said feed mechanism comprises the following elements: a pair of first feed rollers disposed downstream of said wire supply source and continuously driven and variable in speed, a pair of second feed rollers disposed downstream of and spaced at a predetermined distance from said pair of first feed rollers, said second feed rollers comprising length measuring means and being intermittently driven according to desired length measuring conditions, with a section being defined between said first and second feed rollers where said insulated wire is forced to slack, and slack detecting means installed for cooperation with said wire slack section for detecting a predetermined minimum or maximum amount of slack in said wire slack section to produce a signal for accelerating or decelerating said pair of first feed rollers for a fixed period of time, said cutting and stripping mechanism comprising a group of cutting blades disposed downstream of and spaced a predetermined distance from said pair of first feed rollers, said group of cutting blades comprising a pair of opposed wire cutting blades, and pairs of first and second insulation cutting and stripping blades disposed upstream and downstream of said wire cutting blades, respectively, and juxtaposed with and opposed to said wire cutting blades, the arrangement being such that the opening and closing action of said cutting blades effects the cutting of the insulated wire and of the insulation on both sides of the position at which said insulated wire has thus been cut, and first and second movable clamps separately movable in the direction of the wire, said movable clamps serving to strip the insulation on both sides of said cut position of the wire when they are moved away from each other and from said cutting blades while clamping the wire during the closing of said cutting blades group, said apparatus further comprising a wire guiding device which can be opened and closed, said wire guiding device being disposed between said pair of wire cutting blades and said first insulation cutting and stripping blades, said wire guiding device being arranged so that it changes from its closed to its opened state from the time just prior to said group of cutting blades starting its closing operation until the time it completes its closing operation and it also changes from its opened to its closed state from the time when said movable clamps start to return upon completion of said insulation stripping until the time just prior to the completing of said return movement of said movable clamps.

2. The apparatus of claim 1, wherein said wire guiding device comprises a pair of opening and closing arms having recesses formed in their opposed front end surfaces to allow easy passage of the wire therethrough when the arms are closed, gears fixed on respective shafts of said opening and closing arms at their lower ends so as to mesh with each other, a swinging arm fixed at its base end on the shaft of one of said gears, and a link and cam mechanism for swinging said arm.

3. The apparatus of claim 1, wherein said wire guiding device comprises a pair of opening and closing arms having recesses formed in their opposed front end surfaces to allow easy passage of the wire therethrough when the arms are closed, gears fixed on the respective shafts of said opening and closing arms at their lower ends so as to mesh with each other, a swinging arm fixed at its base end on the shaft of one of said gears, and a solenoid mechanism for swinging said arm.

4. The apparatus of claim 1, wherein said second pair of feed rollers (35) is adapted to be moved in timed relation to the movement of said first movable clamp (42) when said wire guiding device is in its closed state.

* * * * *